United States Patent [19]
Bushnell

[11] Patent Number: 5,732,128
[45] Date of Patent: Mar. 24, 1998

[54] METHOD AND APPARATUS FOR STORING CALL FEATURE DATA

[75] Inventor: William Jackson Bushnell, St. Charles, Ill.

[73] Assignee: Lucent Technologies Inc., Murray Hill, N.J.

[21] Appl. No.: 609,036

[22] Filed: Feb. 29, 1996

[51] Int. Cl.$^6$ .................. H04M 15/00; H04M 15/06
[52] U.S. Cl. .................. 379/119; 379/121; 379/126; 379/127; 379/116; 379/207; 379/201
[58] Field of Search .................. 379/111, 112, 379/114–116, 119–121, 126, 127, 128, 133, 134, 135, 201, 207, 219, 222, 229, 242–246

[56] References Cited

U.S. PATENT DOCUMENTS

| | | | |
|---|---|---|---|
| 5,003,584 | 3/1991 | Benyacar et al. | 379/119 |
| 5,184,345 | 2/1993 | Sahni | 379/114 |
| 5,506,893 | 4/1996 | Buscher et al. | 379/114 |

*Primary Examiner*—Curtis Kuntz
*Assistant Examiner*—Paul Loomis
*Attorney, Agent, or Firm*—Jack R. Penrod

[57] ABSTRACT

A method and apparatus for recording call features, whenever they are sactivated, at the originating and/or terminating switch, whether or not the call features activated have successful results. Many such call feature activation records are gathered together and analogized to assist telecommunications customers make informed decisions about the types of call features they should buy and at what price in order to complete more calls and increase business.

16 Claims, 4 Drawing Sheets

| ORIGINATING RECORD | | | |
|---|---|---|---|
| 708-555-1234 | | | |
| 11/30/95 1:00 P.M. | | | |
| CALL SETUP | COMPLETED | CALLED NUMBER 708-111-1111 | TIME |
| THREE WAY CALL | NOT COMPLETED | CALLED NUMBER 708-555-2222 | TIME |

| TERMINATING RECORD | | | |
|---|---|---|---|
| 708-111-1111 | | | |
| 11/30/95    1:00 P.M. | | | |
| CALL SETUP ATTEMPT | COMPLETED | CALLING NUMBER 708-555-1234 | TIME |
| CALLER I.D. DELIVERY | COMPLETED | CALLING NUMBER (PRIVATE) | TIME |
| CALL FORWARD NO ANSWER | ACTIVATED AND COMPLETED | FORWARDED TO NUMBER 708-555-4444 | TIME |

| ORIGINATING RECORD | | | |
|---|---|---|---|
| 708-555-1234 | | | |
| 11/30/95 | | 1:00 P.M. | |
| CALL SETUP | COMPLETED | CALLED NUMBER 708-111-1111 | TIME |
| THREE WAY CALL | NOT COMPLETED | CALLED NUMBER 708-555-2222 | TIME |

| TERMINATING RECORD | | | |
|---|---|---|---|
| 708-111-1111 | | | |
| 11/30/95 | | 1:00 P.M. | |
| CALL SETUP ATTEMPT | COMPLETED | CALLING NUMBER 708-555-1234 | TIME |
| CALLER I.D. DELIVERY | COMPLETED | CALLING NUMBER (PRIVATE) | TIME |
| CALL FORWARD NO ANSWER | ACTIVATED AND COMPLETED | FORWARDED TO NUMBER 708-555-4444 | TIME |

HEADER / FEATURE ACTIVITY (originating); HEADER / FEATURE ACTIVITY (terminating)

*FIG. 6*

METHOD AND APPARATUS FOR STORING CALL FEATURE DATA

TECHNICAL FIELD

The invention relates to telecommunication switches and more particularly to methods and apparatus for storing and processing information regarding calling features activated during a call.

DESCRIPTION OF THE PRIOR ART

Telephone companies offer a wide variety of call processing features such as three way calling, call waiting, etc. Most of the features are offered on a flat rate basis. That is the subscriber pays a fixed monthly fee and can use the feature an unlimited number of times. As telephone service becomes deregulated, telephone companies will be able to offer a wide variety of pricing arrangements. Furthermore, telephone companies will seek to promote the use of features such as call waiting and voice mail which increase the number of completed calls and hence increase revenues.

Historically, telephone companies recovered the cost of the services through flat rate billing. Hence, unless there is a cost per completion to be billed by a billing system, there is currently no capabilities in telephone switching equipment to record which features a particular subscriber uses. Further, the cost of computer memory and processing were so expensive that it was not cost effective to record the subscribers use of features if a billing record did not result. In such an environment, measurement of an individual customer's telephone activities was not cost effective and simply was not done.

SUMMARY OF THE INVENTION

Briefly stated, in accordance with one aspect of the invention, an advance in telecommunications art is achieved by providing a method for recording and analyzing a customer's feature usage. This method records in the telephone company's central office switch call activity as it occurs and periodically transmits these records to an analysis system which sorts and summarizes customers' feature usage.

In accordance with another aspect of the invention, an advance in the telecommunication service art is provided by a method for assembling an originating call record which includes the steps of originating a call from a calling station to a terminating station by connecting to an originating telecommunication switch; and opening an originating call record by storing data regarding a calling station directory number, a date of the call, a start time of the call, a call setup feature activation, a call setup result and a terminating station directory number. After the result of the call setup feature is activated, determining if a subsequent call feature is activated before the call is ended and if a subsequent call feature has been activated storing a feature type, a feature result for the subsequent feature and any directory number related to the subsequent feature to the end of the call record, and if a subsequent call feature has not been activated before the call is ended adding nothing further to the call record. At the end of the call, storing the call record in the originating telecommunication switch.

In accordance with another aspect of the invention, an advance in the telecommunication service art is provided by a method for assembling a terminating call record, which includes the steps of receiving a call from a calling station by a terminating station by connecting through a terminating telecommunication switch; and opening a terminating call record by storing data regarding a called station directory number, a date of the call, a start time of the call, a call setup feature activation, a call setup result and an originating station directory number. After the results of the call setup feature are recorded, determining if a subsequent call feature is activated before the call is ended and if a subsequent call feature has been activated storing a feature type, a feature result for the subsequent feature and any directory number related to the subsequent feature to the end of the call record, and if a subsequent call feature has not been activated before the call is ended adding nothing further to the call record. At the end of the call, storing the call record in the terminating telecommunication switch.

In accordance with yet another aspect of the invention, an advance in the telecommunication service art is provided by a method for assembling a call record which includes the steps of originating a call from a calling station to a terminating station by connecting to an originating telecommunication switch; opening an originating call record by storing data regarding a calling station directory number, a date of the call, a start time of the call, a call setup feature activation, a call setup result and a terminating station directory number; determining if a subsequent call feature is activated before the call is ended and if a subsequent call feature has been activated storing a feature type, a feature result for the subsequent feature and any directory number related to the subsequent feature to the end of the call record, and if a subsequent call feature has not been activated before the call is ended adding nothing further to the call record; upon the end of the call, storing the originating call record in the originating telecommunication switch. The method also includes the steps of receiving the call from the calling station for a terminating station; opening a terminating call record by storing data regarding the calling station directory number, the date of the call, the start time of the call, the call setup feature activation, the call setup result and the terminating station directory number; determining if a subsequent call feature is activated before the call is ended and if a subsequent call feature has been activated storing a feature type, a feature result for the subsequent feature and any directory number related to the subsequent feature to the end of the call record, and if a subsequent call feature has not been activated before the call is ended adding nothing further to the call record; upon the end of the call, also storing the call record in the terminating telecommunication switch; and communicating the originating call record and the terminating call record to a data analysis system where they are combined into a single record and analyzed with similar call records of this directory number to determine how the call feature customer may obtain better call service.

BRIEF DESCRIPTION OF THE DRAWING

FIG. 6 is a representation of the a record that combines call activation information regarding both origination and termination.

For the purposes of this invention, a call attempt which activates one or more features is a call for call record purposes, whether it is successfully completed or not only makes a difference in the length and results field of the call record.

DETAILED DESCRIPTION

Figure 1:
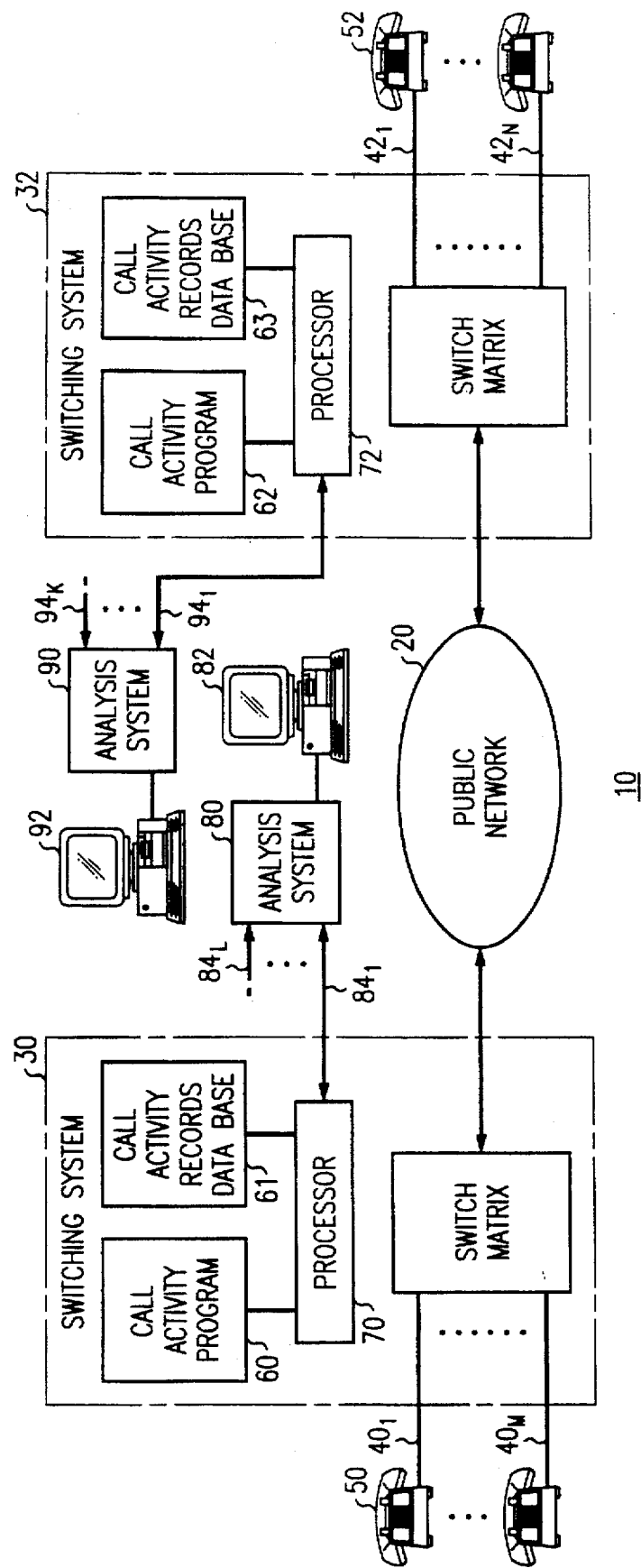
FIG. 1 is a block diagram of a telecommunications system useful for practicing the invention.

Referring to FIG. 1, a telecommunications system 10 is shown. Telecommunication system 10 has a public network 20 which is connected to and carriers calls between central office switches 30, 32. Lines $40_1-40_M$ and $42_1-42_N$ are respectively connected to switches 30, 32. The lines $40_1-40_M$ and $42_1-42_N$ terminate at telecommunication stations of various types, such as analog and ISDN telephone sets. For brevity, only station 50 is shown connected to switch 30 and only station 52 is shown connected to switch 32, but these are not meant to be limiting to the scope of the invention and claims.

For the purpose of this example, station 50 will be considered as originating the call activity and station 52 as terminating (i.e. is the end point of) the call activity. Those call activities include those call attempts from station 50 which are completed to station 52 as well as those call attempts that are not completed, as long as even the most basic service feature is activated in switches 30 and 32.

Switches 30, 32 have feature data and programs (not shown) which provide various known call features for subscribing customers, such as call waiting, call forwarding, voice mail, et cetera. Additionally, switches 30, 32 have respective call activity programs 60, 62 implemented in hardware and/or software for recording feature activations by calls originated or terminated by the switches 30, 32. Processors 70, 72 run call activity programs 60, 62 which provide respective call activity data recording processes. Processors 70, 72 may be the main processors of their respective switches 30, 32 or they may be auxiliary processors which assist their respective main processors to process the programs 60, 62 and collect the data that is stored in call activity databases 61, 63.

Switch 30 is connected to and regularly communicates with data analysis system 80 in order to transfer the call activity information recorded by the call activity data recording processes according to the present invention. Data analysis system 80 uses some fairly standard techniques to measure each individual customer's behavior with respect to presently subscribed call features and identify trends and patterns in order to offer tailored call feature packages to help each customer better manage his/her calls. Data analysis system 80 is connected to computer system 82, which is a user interface and may assist in the data analysis system 80 in analysis tasks. Together, data analysis system 80 and computer system 82 receive, store and process large quantities of data via lines $84_1-84_L$. Lines $84_2-84_L$ are available to connect to other central office switches, such as switch 32, to complete data records and centralize this function to gain economies of scale. Dam analysis system 90 and computer system 92 are used in arrangements where centralization of the data analysis function is not implemented.

Figures 2, 3:
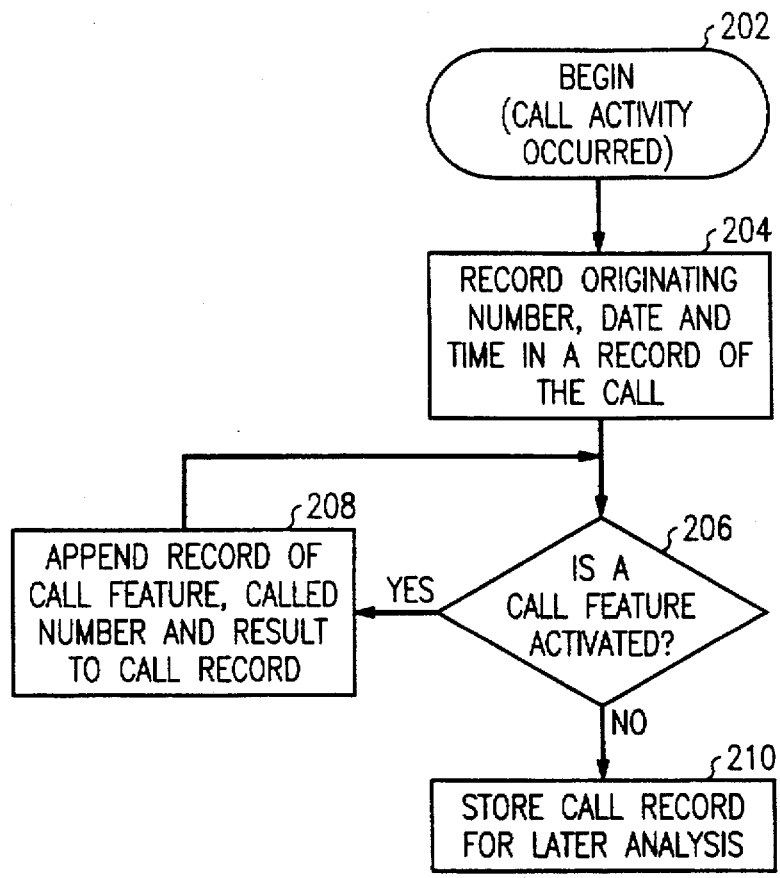
FIG. 2 is a logic flow diagram of a method for recording feature activation information during call origination according to the present invention.
FIG. 3 is representation of the data that may be recorded by the method.

Switch 30, as the exemplary originating switch, has its processor 70 perform the call activity recording method 200 shown in FIG. 2. Referring now to FIG. 2, method 200 starts with beginning step 202 whenever a call is originated, such as by lifting the handset of station 50 (shown in FIG. 1) and dialing a telephone number. After the beginning step 202, the method 200 progresses to step 204, which records the originating number, the time and date of the call activity in an originating call activity record. Next, method 200 progresses to step 206 which determines whether or not a previously unrecorded call feature has been activated in the switch 30 attached to the originating station 50 (both shown in FIG. 1). If a call feature has been activated, method 200 progresses to step 208 where a record of this call activity is assembled from available data and stored. An example of an originating call activity record from originating directory number 708-555-1234 is shown in FIG. 3. Each originating call activity record contains the date, time, called directory number, each call feature activated, the timing of each feature activation and the result of that activity is recorded in the record. Since basic voice service is considered a feature for the purposes of this invention, the call activity record will even record incomplete calls, such as those that result in a busy signal or a tinging-no-answer hang-up. Timing information, for example the number of rings a caller will endure before hanging up, is important information to commercial customers for call forwarding and voice mail systems.

After the latest call activity is recorded in step 208, method 200 progresses again to step 206 where again a determination is made if a previously unrecorded call feature has been activated. As long as unrecorded call features continue to be activated, determination step 206 continues to have call activity recording step 208 be the next step. At some point, step 206 will determine that no previously unrecorded call feature has been activated and method 200 will progress to step 210. Step 210 the origination call feature activation record of this call is completed and stored in database storage unit of the originating switch 30.

An important part of the call activity recording is the use of a variable length Originating Call Activity Record which records feature activity on each call, an example of which is shown in FIG. 3. The Originating Call Activity Record identifies: the originating or terminating customer, each feature that was activated on a call, how the feature was used by the customer and relevant data associated with the feature. The more features that are activated, the longer this record becomes. For the purposes of this invention, a subsequent instance of a previously activated feature is an unrecorded call feature. Thus, if a call origination activates a busy feature, a call forwarding feature and a second busy signal at station or line to which the call was forwarded, the second busy is a previously unrecorded feature because it is in response to a different sequence of inputs than the previous busy signal.

Figures 4, 5:
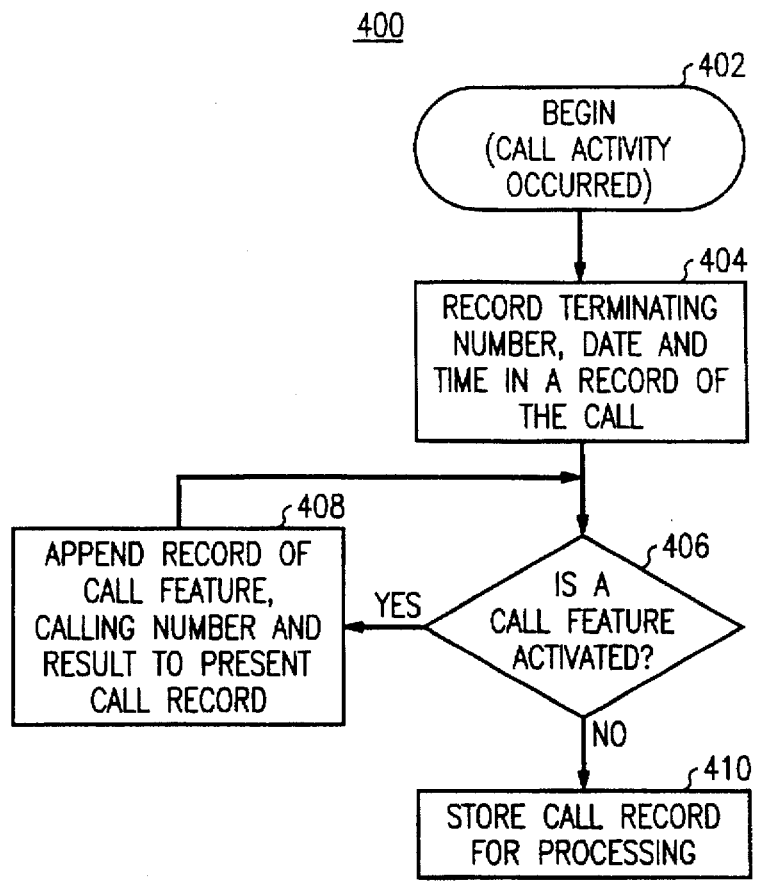
FIG. 4 is a logic flow diagram of a second method for recording feature activation information during call termination according to the invention.
FIG. 5 is a representation of the data that maybe recorded by this second method.

Similar to originating switch 30, exemplary terminating switch 32, has its processor 72 perform the call activity recording method 400 shown in FIG. 4. Referring now to FIG. 4, method 400 starts with beginning step 402 whenever a call is received, such as by being connected to the terminating station 52, i.e. the destination station. After the beginning step 402, the method 400 progresses to step 404, which records the terminating directory number, the time and date of the call activity in a terminating call activity record. Next, method 400 progresses to step 406 which determines whether or not a previously unrecorded call feature has been activated in the switch 32 attached to the terminating station 52 (shown in FIG. 1). If a call feature has been activated, method 400 progresses to step 408 where a record of this call activity is assembled from available data and stored. An example of an terminating call activity record destined for directory number 708-111-1111 is shown in FIG. 5. Each terminating call activity record contains the date, time, called directory number, each call feature activated and the result of that activity is recorded in the record.

Since, as with the originating switch 30, basic voice service is considered a feature for the purposes of this invention, the call activity record will even record incomplete calls, such as those that result in a busy signal or a ringing-no-answer hang-up.

After the latest call activity is recorded in step 408, method 400 progresses again to step 406 where again a determination is made if a previously unrecorded call feature has been activated. As long as unrecorded call features continue to be activated, determination step 406 continues to have call activity recording step 408 be the next step. At some point, step 406 will determine that no previously unrecorded call feature has been activated and method 400 will progress to step 410. At step 410 the terminating call feature activation record of this call is completed and stored in database storage unit of the terminating switch 32.

Thus, Call Activity Records are generated on switches 30, 32, which serve the customer that originates the call and the called customer. Call Activity Records are generate on both completed calls and on uncompleted calls. Note this is in contrast to billing records which are only generated on the switch that serves the customer that originated the call. Furthermore billing records are usually only generated for completed calls.

The layout of a combined Call Activity Record is indicated in FIG. 6. As shown, the record header includes the telephone number of the customer; the date and the time. Following the header, the Call Activity Record has a variable number of fields that correspond to each of the features invoked on the call. The sequence of activities in the fields corresponds to the order in which the features were activated on the call. Note by using this approach, the Call Activity Record can show repeated use of the same feature, as mentioned previously.

A typical originating Call Activity Record is shown in FIG. 3. On this call, the customer (708-555-1234) completed a call to the number indicated (708-111-1111) which may be completed within a single switch 30, or it may require both switches 30, 32 for this call. During the call, the customer attempted to establish a three way call which reached a busy line (708-555-2222).

A typical terminating Call Activity Record is shown in FIG. 5. On this call, the called customer's line (708-111-1111) was idle and the called customer received the incoming caller ID (Private) but did not answer the call. The call was forwarded to a voice mailbox (708-555-4444).

At the completion of each originating or terminating call (or call attempt), the Call Activity Record is transferred from the switch 30 or 32 to the Analysis System. 80 or 90 If the call originating and terminating activities are both performed by the same central office switch, such as switch 30, the both originating and terminating call activity records will be transferred to the same analysis system, such as analysis system 80, on the same line, such as line 84₁. If the originating and terminating call activities take place on different switches, such as switches 30 and 32, then one of the analysis systems must receive the originating call activity record from the originating switch, such as switch 30, and the terminating call activity record from the terminating switch, such as switch 32, and correlate the two parts of each call activity record to form a complete call activity record as shown in FIG. 6. For the situation where the originating switch and the terminating switch may not be cooperatively linked to provide complete call activity records, partial records may be kept and analyzed separately for the originating call activity and the terminating call activity of customers. The summaries will just not be as conclusive and as helpful as they could have been if complete call activity records were available.

Each Analysis System 80, 90 has a large database that is able to store all of the Call Activity Records generated by all customers for a significant period of time (30–90 days). The Analysis Systems 80, 90 also have various sorting and summarizing processes that can be used to search the data and summarize the behavior of various customers. These summaries can be done on either a customer basis or on a feature basis. Specific examples of potential search processes include:

1. BUSY LINES SEARCH—A small businesses could be missing calls because all of the lines to that business are busy. If the telephone company could measure the number of times a small business misses calls due to "all lines busy" the telephone company could potentially sell the business some additional telephone lines. For this application, the Analysis System would look at all termination attempts to a particular telephone number. For each attempt, the process would read the Call Activity Record to determine if the call was completed or blocked due to a busy line. As the Analysis System sorts through each termination attempt record it scores peg counts of the number of completed calls and blocked calls for each telephone number. After all the records are processed, the Analysis System scans across the peg counts to look for telephone numbers with excessive number of missed calls (e.g., more that 20 blocked calls per month) or it looks for telephone numbers that have a high ratio of completed to block calls over the past month. The Analysis System then generates a summary report that identifies the telephone numbers with "high" instances of blocked calls. These telephone numbers are then candidates for proactive sales calls from the telephone company business office.

2. CALL COMPLETION SEARCH—Telephone companies offer several call management features that help customers handle multiple simultaneous calls. These features include: call waiting, call waiting with caller ID, centralized voice messaging. If customers utilize these features more calls are completed and hence the telephone company's revenues increase. In many cases customers may have some of these call management features but may not be using them frequently. If the number of unanswered calls is very large and many of the calls would have produced long distance toll revenues, the telephone company may want to give these customers centralized voice mail. For this application, the Analysis System sorts all terminating Call Activity Records for calls that included the call waiting feature. These records are sorted by telephone number and individual telephone number statistics are generated on the number of answered and unanswered waiting calls. For those telephone numbers with a large number of unanswered waiting calls, the Call Activity Records are further analyzed to determine the lost revenue. The Analysis System then generates a report of all telephone numbers with more than a certain level of lost revenue per month.

3. USAGE SENSITIVE PRICING SEARCH— Telephone companies are beginning to offer some features on a pay per use basis. These features include three way calling, automatic call back, etc. The telephone company might want to offer a service on a two tier pricing scheme: For example, $0.05 per use or $1.00 per month for unlimited use. Before the telephone company offers a features on a pay per use basis, they would like to know how often customers currently use the feature. This would allow them to adjust the pay per use prices to stimulate additional revenues without eroding existing revenues. For this application the Analysis System would search the Call Activity Records for calls that involved the feature of interest. The Analysis System would then keep track of how many times a feature was activated by each telephone user. The analysis system would then generate a histogram that indicates how many users used a feature a given number of times per month.

Similarly there are many other applications for this marketing data such as measuring the effectiveness of advertisements for stimulating feature usage; analyzing features usage on a time of day basis and offering discounts for off peak usage. etc.

Generating a Call Activity Record on each call attempt will result in a large amount of data that must be stored on the switching system and eventually transported to the Analysis System. Currently, switching systems store and transport large volumes of per call billing information using the Automatic Message Accounting Systems. It is anticipated that the Call Activity Records could be stored and transported by expanding the AMA storage and transport facilities. The AMA data collection systems could be modified to identify the Call Activity Records and remove them from the stream of AMA records so that there is no impact to the downstream bill rendering systems.

Even though memory and processing costs are decreasing the proposed Market Data Analysis System requires a substantial investment. Furthermore, generating a Call Activity Record on all calls may not be warranted. Some customers may not have sufficient call activity to warrant recording their calls. In other cases, the telephone company may only want to record the activity of a subset of features. To reduce the recording cost a feedback mechanism is proposed from the Analysis System to the switching system. This feedback system informs the switch which calls to record and which features to record.

For example, when a new business customer is first activated, all of the originating and terminating call attempts are recorded. After one month, the Analysis System summarizes the customers activity in terms of blocked incoming calls, unanswered waiting calls, etc. If the customers behavior is in line with the telephone company's service norms, the Analysis System sends a message to the Switch to only record future calls on a sampled basis (e.g., 1 out of 10 calls are recorded).

Thus, it will now be understood that there has been disclosed a method and apparatus for recording and analyzing call feature activity data. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed is:

1. A method for assembling an originating call record comprising the steps of:

originating a call from a calling station to a terminating station by connecting to an originating telecommunication switch;

opening an originating call record by storing data regarding a calling station directory number, a date of the call, a start time of the call, a call setup feature activation, a call setup result and a terminating station directory number;

determining if a subsequent call feature is activated before the call is ended and if a subsequent call feature has been activated storing a feature type, a feature result for the subsequent feature and any directory number related to the subsequent feature to the end of the call record, and if a subsequent call feature has not been activated before the call is ended adding nothing further to the call record; and upon the end of the call, storing the call record in the originating telecommunication switch.

2. The method of claim 1, further comprising the step of:

reading the call record out of the originating telecommunication switch into a feature utilization computer.

3. The method of claim 2, further comprising the step of:

analyzing the call record for an unsuccessful call feature activation which indicates a need for further equipment by the originating party of the call.

4. The method of claim 2, further comprising the step of:

analyzing the call record for an unsuccessful call feature activation which indicates a need for a further call feature by the originating party of the call.

5. The method of claim 2, further comprising the step of:

analyzing the call record for an unsuccessful call feature activation which indicates a need for a different call feature price schedule to reduce customer costs.

6. A method for assembling a terminating call record comprising the steps of:

receiving a call from a calling station by a terminating station by connecting through a terminating telecommunication switch;

opening a terminating call record by storing data regarding a called station directory number, a date of the call, a start time of the call, a call setup feature activation, a call setup result and an originating station directory number;

determining if a subsequent call feature is activated before the call is ended and if a subsequent call feature has been activated storing a feature type, a feature result for the subsequent feature and any directory number related to the subsequent feature to the end of the call record, and if a subsequent call feature has not been activated before the call is ended adding nothing further to the call record; and upon the end of the call, storing the call record in the terminating telecommunication switch.

7. The method of claim 6, further comprising the step of:

reading the call record out of the terminating telecommunication switch into a feature utilization computer.

8. The method of claim 7, further comprising the step of:

analyzing the call record for an unsuccessful call feature activation which indicates a need for further equipment by the originating party of the call.

9. The method of claim 7, further comprising the step of:

analyzing the call record for an unsuccessful call feature activation which indicates a need for a further call feature by the called party of the call.

10. A method for assembling a call record comprising the steps of:

a. receiving a call from a calling station for a terminating station connected thereto b. opening a terminating call record by storing data regarding a calling station directory number, a date of the call, a start time of the call, a call setup feature activation, a call setup result and a terminating station directory number;

c. determining if a subsequent call feature is activated before the call is ended and if a subsequent call feature has been activated storing a feature type, a feature result for the subsequent feature and any directory number related to the subsequent feature to the end of the call record, and if a subsequent call feature has not been activated before the call is ended adding nothing further to the call record; and d. upon the end of the call, storing the call record in the terminating telecommunication switch.

11. The method of claim 10, further comprising the step of:

reading the call record out of the terminating telecommunication switch into a feature utilization computer.

12. The method of claim 11, further comprising the step of:

analyzing the call record for an unsuccessful call feature activation which indicates a need for further equipment by the originating party of the call.

13. The method of claim 11, further comprising the step of:

analyzing the call record for an unsuccessful call feature activation which indicates a need for a further call feature by the originating party of the call.

14. The method of claim 11, further comprising the step of:

analyzing the call record for an unsuccessful call feature activation which indicates a need for a different pricing schedule to reduce costs.

15. The method of claim 10, further comprising the steps of:

combining said terminating call record with an originating call record for the same call; and analyzing the combined call record for an unsuccessful call feature activation which indicates a need for a different feature to more effectively communicate to a caller.

16. A method for assembling a call record comprising the steps of:

originating a call from a calling station to a terminating station by connecting to an originating telecommunication switch;

opening an originating call record by storing data regarding a calling station directory number, a date of the call, a start time of the call, a call setup feature activation, a call setup result and a terminating station directory number;

determining if a subsequent call feature is activated before the call is ended and if a subsequent call feature has been activated storing a feature type, a feature result for the subsequent feature and any directory number related to the subsequent feature to the end of the call record, and if a subsequent call feature has not been activated before the call is ended adding nothing further to the call record;

upon the end of the call, storing the originating call record in the originating telecommunication switch;

receiving the call from the calling station for a terminating station;

opening a terminating call record by storing data regarding the calling station directory number, the date of the call, the start time of the call, the call setup feature activation, the call setup result and the terminating station directory number;

determining if a subsequent call feature is activated before the call is ended and if a subsequent call feature has been activated storing a feature type, a feature result for the subsequent feature and any directory number related to the subsequent feature to the end of the call record, and if a subsequent call feature has not been activated before the call is ended adding nothing further to the call record;

upon the end of the call, storing the call record in the terminating telecommunication switch; and communicating said originating call record and said terminating call record to a data analysis system where they are combined into a single record and analyzed with similar call records of this directory number to determine how the call feature customer may obtain better call service.

* * * * *